United States Patent [19]

Kokkila et al.

[11] 4,154,316

[45] May 15, 1979

[54] APPARATUS FOR CHANGING AXLE LOADS OF A CRANE VEHICLE COMBINATION

[75] Inventors: Kalevi Kokkila; Visa Luukkonen, both of Tampere, Finland

[73] Assignee: Rauma-Repola Oy, Finland

[21] Appl. No.: 784,834

[22] Filed: Apr. 5, 1977

[30] Foreign Application Priority Data

Apr. 23, 1976 [FI] Finland ................................ 761119

[51] Int. Cl.[2] ............................................ B62D 53/04

[52] U.S. Cl. .............................. 180/14 R; 212/46 R; 280/406 R

[58] Field of Search ................. 280/81, 404, 405, 406; 180/14 R; 212/46, 55, 59 R

[56] References Cited

U.S. PATENT DOCUMENTS

| | | | |
|---|---|---|---|
| 2,859,049 | 11/1958 | Hyler | 280/406 R |
| 3,224,597 | 12/1965 | Whitmire | 212/59 |
| 4,039,085 | 8/1977 | Livengood | 212/46 R |

FOREIGN PATENT DOCUMENTS

| | | | |
|---|---|---|---|
| 1091304 | 10/1960 | Fed. Rep. of Germany | 212/46 A |

*Primary Examiner*—David M. Mitchell
*Assistant Examiner*—Terrance L. Siemens
*Attorney, Agent, or Firm*—Burns, Doane, Swecker & Mathis

[57] ABSTRACT

A load changing apparatus decreases the load on a supporting trailer and increases the load on the axles of main drive vehicle of a crane when desired. The crane's hydraulic system includes a two position valve which cuts off the flow of hydraulic fluid from a crane position controlling valve and directs fluid from a pump to the crane arm lifting cylinder. Limit switches or pressure sensitive valves can be used to limit the amount of movement which is caused by the fluid from the pump.

4 Claims, 2 Drawing Figures

APPARATUS FOR CHANGING AXLE LOADS OF A CRANE VEHICLE COMBINATION

The subject of the present invention is an apparatus for changing the axle loads of a crane vehicle in combination with a full trailer in particular desired situations, such as during the backing of the crane vehicle combination wherein the pivotable front portion of the trailer is locked in relation to the frame of the trailer in a straight position or at some turning angle, or when driving the crane vehicle combination on slippery roads conditions.

In accordance with the present invention, the load changing apparatus is provided with a hydraulic pressure restricting apparatus for restricting the pressure and flow of hydraulic fluid which is passed to the arm lifting cylinders of the crane. The restricting apparatus prevents the arm from rising and sinking freely as it normally does during transport, and supplies a limited pressure to lift the crane arm to reduce the load on the support trailer in desired situations. The restricting apparatus can include a pressure limiting valve whose operation is controlled by a directional valve. The operation of the restricting apparatus can be further controlled by means of an indicator such as limit switches which are sensitive to the distance between the crane arm and the trailer support. The pressure which is delivered to the arm lifting cylinders can be supplied by the crane's drive equipment or by means of separate drive equipment provided for that purpose. Decreasing the load on the support trailer also increases the load on the crane vehicle, to increase traction on slippery roads.

Figure 1:
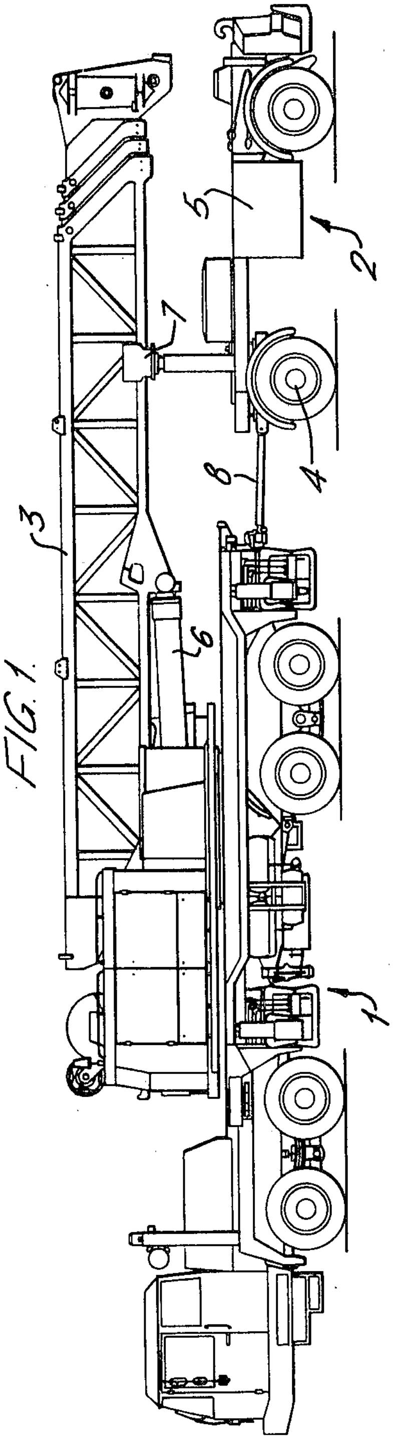
Figure 2:
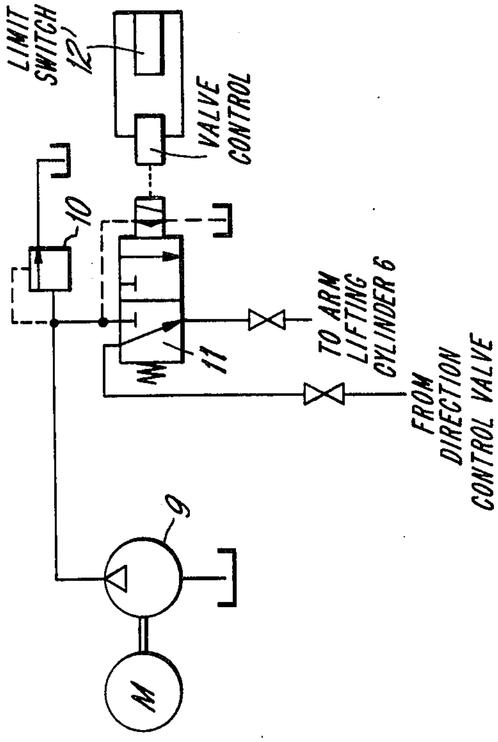

The invention is set forth in more detail in the following description and the attached drawings, wherein FIG. 1 shows a crane vehicle combination in side view and FIG. 2 shows a hydraulic diagram for a relief system for a boom supporting front axle of the trailer.

In FIG. 1 the crane vehicle combination is in the transport position, whereby the arm 3 of the crane, i.e. of the tractor vehicle 1, is substantially in the horizontal position and, at its free end, supported on a separate trailer 2. For the purpose of supporting the crane arm 3, the trailer 2 is, preferably at the front wheels or front bogie, provided with a supporting means 7 upon which the crane arm rests. In order that the axle loads of the vehicle combination should be appropriate, the towing bar 8 of the trailer 2 must be short.

The backing of a vehicle combination of this type becomes remarkably easier if the pivotable front portion 4 of the trailer 2 is provided with a locking system, by means of which, for the purpose of backing, it is possible to lock the front portion 4 of the trailer. Consequently, the turning front wheels of the trailer 2 will be immobile in relation to the trailer 2. The wheels can be locked either in a straight ahead position or at a turning angle that can be selected either stepwise or continuously. As a drawback, this, however, causes strain on the axles and on the drawgear owing to the lateral sliding of the front wheels of the trailer 2 during backing, unless the angle is precisely correct. These forces can be reduced, in accordance with the present invention, by raising the arm 3 of the crane by means of its lifting cylinders 6.

FIG. 2 shows a hydraulic plan for a relief system for the front axle of the trailer 2 suitable for the above-mentioned purpose. This purpose is achieved by reducing the load coming from the arm 3. This can be accomplished to the front axle of the trailer by supplying an oil at the required pressure into the lifting cylinders 6 of the arm 3 by means of a separate hydraulic pump 9 driven by an electrical motor, which pump can be controlled from the carrier vehicle, and a two position valve 11 which is normally biased to direct fluid from a crane direction controlling valve to the arm lifting cylinders 6. The pressure of the pressure liquid is restricted to the desired level by a pressure-limiting valve 10 and, when the pressure restriction is introduced by virtue of reaching the threshold level of the valve 10, the flow into the lifting cylinders stops. Of course, instead of a separately driven hydraulic pump 10, it is also possible to use the hydraulic system of the crane's own or a pressure accumulator in order to supply pressure into the arm 3 lifting cylinders.

According to the invention, the load caused by the arm 3 on the front wheels of the trailer 2 can be reduced either partially or fully. If the load relief is performed fully, it is possible to prevent the arm 3 from rising substantially loose from the support 7 on the trailer 2 by means of a limit switch 12 which detects when the crane arm 3 has been lifted from the support 7 by a predetermined amount to actuate the valve 11 to inhibit further lifting. On the other hand, if the relief is partially performed, the system is prevented from reducing the load to an extent higher or lower than a preset value by means of a pressure limiting valve or pressure responsive switches, for example.

Owing to the movements of the trailer, the apparatus should be constructed preferably such that it adjusts the position of the arm 3 constantly or periodically within short time intervals.

By means of the system, another advantage is also obtained, i.e. the load relief results in an increase in the axle loads of the driving axles of the chassis, which is advantageous in normal driving on slippery roads.

The invention is, of couse, not restricted to the above exemplifying embodiment alone, but it may be carried out in many ways within the scope of the appended claims.

What I claim is:

1. Apparatus for changing the load of the boom of a crane upon a boom supporting trailer, the crane including a hydraulic lifting cylinder controlled by a direction control valve for raising and lowering the boom, comprising:
   - means for supplying hydraulic fluid under pressure to the hydraulic lifting cylinder of a crane to apply a lifting force to the boom of the crane;
   - valve means for connecting said supplying means to the hydraulic lifting cylinder and for disengaging the direction control valve from the hydraulic cylinder; and
   - means for controlling said supplying means to limit the amount of lifting force applied to the boom by the hydraulic cylinder when said supplying means is connected to the hydraulic cylinder.

2. The apparatus of claim 1 wherein said controlling means includes a pressure limiting valve for controlling the pressure of the fluid supplied to the hydraulic cylinder.

3. The apparatus of claim 1 wherein said controlling means includes limit switches responsive to movement of the boom.

4. The apparatus of claim 1 wherein said supplying means includes a fluid reservoir and a hydraulic pump.

* * * * *